(12) United States Patent
O'Kell et al.

(10) Patent No.: US 11,167,692 B2
(45) Date of Patent: Nov. 9, 2021

(54) EMERGENCY LIGHTING

(71) Applicant: Saf-T-Glo Limited, Cwmbran (GB)

(72) Inventors: Sean Patrick O'Kell, Cwmbran (GB); Andrew Jon Hallett, Cwmbran (GB)

(73) Assignee: Saf-T-Glo Limited, Cwmbran (GB)

( * ) Notice: Subject to any disclaimer, the term of this patent is extended or adjusted under 35 U.S.C. 154(b) by 0 days.

(21) Appl. No.: 16/534,089

(22) Filed: Aug. 7, 2019

(65) Prior Publication Data
US 2020/0047665 A1 Feb. 13, 2020

(30) Foreign Application Priority Data
Aug. 10, 2018 (GB) ..................... 1813139

(51) Int. Cl.
*B60Q 3/78* (2017.01)
*F21V 9/32* (2018.01)
(Continued)

(52) U.S. Cl.
CPC ............. *B60Q 3/78* (2017.02); *B60Q 3/20* (2017.02); *B64D 11/00* (2013.01); *F21V 9/32* (2018.02);
(Continued)

(58) Field of Classification Search
CPC .... B60Q 3/78; B60Q 3/20; B60Q 3/46; F21V 9/32; G08B 5/00; G08B 7/066; B64D 11/00; B64D 45/00; B64D 2045/007; B64D 47/00; B64D 47/02; F21W 2107/30; F21W 2106/00; F21K 2/00; B64C 1/18
See application file for complete search history.

(56) References Cited

U.S. PATENT DOCUMENTS 5,724,909 A * 3/1998 Pitman ................. F21K 2/00
116/202
5,961,072 A * 10/1999 Bodie .................. B60Q 3/46
244/118.5
(Continued)

FOREIGN PATENT DOCUMENTS

GB 2 448 424 10/2008
GB 2 512 498 10/2014
(Continued)

OTHER PUBLICATIONS

Search Report regarding Appl. No. GB 1813139.1 dated Feb. 11, 2019, 4 pps.
(Continued)

*Primary Examiner* — David Sample
*Assistant Examiner* — Donald M Flores, Jr.
(74) *Attorney, Agent, or Firm* — Foley & Lardner LLP (57) ABSTRACT

A photoluminescent aircraft floor path marking system includes at least a flexible track having a housing incorporating a flexible, pliable, photoluminescent portion in which the track is bendable to a radius of 1 m or less and the track has a length of at least 2 m, where the track is pliable such that it can retain a rolled or bent radius. The track may be bendable to a radius of from 0.01 m to 1.0 m or optionally from 0.01 m to 0.5 m. The flexible track may be provided in lengths of from 3 m or greater or greater than 10 m. A flexible protective layer may be provided. The flexible housing may include a holder for the photoluminescent material.

19 Claims, 3 Drawing Sheets

(51) Int. Cl.
  *G08B 5/00*      (2006.01)
  *B64D 11/00*     (2006.01)
  *B60Q 3/20*      (2017.01)
  *F21W 107/30*    (2018.01)
  *F21W 106/00*    (2018.01)

(52) U.S. Cl.
  CPC ........... G08B 5/00 (2013.01); *F21W 2106/00* (2018.01); *F21W 2107/30* (2018.01)

(56)           References Cited

U.S. PATENT DOCUMENTS

| 2002/0071276 A1* | 6/2002 | Blum ..................... | F21V 19/00 |
| | | | 362/249.07 |
| 2003/0049456 A1* | 3/2003 | Kawasato .............. | G02B 5/208 |
| | | | 428/421 |
| 2007/0097664 A1* | 5/2007 | Stokes ..................... | B60Q 3/46 |
| | | | 362/84 |
| 2014/0293617 A1* | 10/2014 | O'Kell ..................... | B60Q 3/46 |
| | | | 362/317 |

FOREIGN PATENT DOCUMENTS

| GB | 2 516 614 | 2/2015 |
| GB | 2 524 106 | 9/2015 |
| WO | WO-2016/034532 | 3/2016 |

OTHER PUBLICATIONS

Search Report regarding Appl. No. GB 1911253.1 dated Jan. 10, 2020, 4 pps.

\* cited by examiner

EMERGENCY LIGHTING

CROSS-REFERENCE TO RELATED APPLICATIONS

The present application claims priority to and the benefit of GB Patent Application No. 1813139.1, filed Aug. 10, 2018, the entire disclosure of which is incorporated by reference herein in its entirety.

BACKGROUND

The present application relates to aircraft emergency lighting typically for the interior of vehicles and especially relating to emergency exit floor path lighting for aircraft. This application is particularly concerned with improvements in or relating to emergency lighting and in particular, but not exclusively, to emergency lighting used to indicate an escape path leading to an exit for evacuation of a passenger vehicle in an emergency such as following an accident.

The concepts described herein have particular application to passenger vehicles and to aircraft in particular of the type in which rows of seats are provided on either side to an aisle with an exit at one or both ends of the aisle and/or on one or both sides of the aisle between the ends of the vehicle. These concepts are particularly applicable to aircraft in which emergency lighting systems are provided in which photoluminescent material is incorporated into a track extending along the aisle for passengers to follow to the exits. When exposed to light, the photoluminescent material is activated and emits light that is visible under conditions of darkened or low illumination from other light sources such as when smoke from a fire blocks overhead light sources. The level of illumination provided by the photoluminescent material is sufficient to guide passengers from their seats to an exit in order to evacuate the aircraft.

Current, prior art, photoluminescent floor path marking systems are typically supplied in rigid or semi-rigid lengths of around 2 m (6 ft) due to limitations in terms of access to an aircraft cabin. It will be appreciated that there may be difficulty in accessing an aircraft cabin via a door in the fuselage. Dimensional constraints of an aircraft fuselage restrict a possible length of rigid or semi-rigid housing or track that can be used. Further it is to be understood that an aircraft cabin can have restricted access and limited space inside for maneuvering lengths of housing or track within the cabin. A fitting mechanic is required to install the lengths of photoluminescent system and to cut lengths to size as required. It will be appreciated that a joint has to be provided between each length and an adjoining length. Each joint is a point of weakness in which water and dirt can enter the photoluminescent marker system and cause additional wear. Further a joint can be aesthetically displeasing. Conventionally joints have to be utilised as a result of the limitations on a maximum length of housing or track that can be utilised in an aircraft cabin. Typically a maximum length is 2 m and therefore it has been necessary to provide a joint every 2 m. Additionally it has been found that storage of rigid or semi-rigid tracks having a length greater than 2 m is not desirable. Also there is a significant expenditure of time and effort in laying the system with a large number of joints particularly in a restricted area such as an aisle. It will be appreciated that there can also be difficulties in removal of one or more lengths which may be required if there has been damage to the track in the course of use of the track in an aircraft.

The present application seeks to provide improvements to the photoluminescent emergency lighting systems.

SUMMARY

According to an exemplary embodiment, a photoluminescent aircraft floor path marking system includes a flexible track having a housing incorporating a flexible, pliable, photoluminescent portion, wherein the track is bendable to a radius of 1 meter or less, wherein the track has a length of at least 2 meters, and wherein the track is pliable such that it can retain a rolled or bent radius.

According to another exemplary embodiment, a method of fitting a photoluminescent aircraft floor path marking system is provided. The marking system includes a flexible track having a housing incorporating a flexible, pliable, photoluminescent portion, wherein the track is bendable to a radius of 1 m or less, wherein the track has a length of at least 2 meters, and wherein the track is pliable such that it can retain a rolled or bent radius. The method includes providing a roll of the flexible photoluminescent floor path marker, unrolling the marker system onto a floor of an aircraft, and securing the marker system to the floor.

According to another exemplary embodiment, an aircraft includes a cabin with a photoluminescent floor path marking system installed in the aircraft cabin. The photoluminescent aircraft floor path marking system includes a flexible track having a housing incorporating a flexible, pliable, photoluminescent portion. The track is bendable to a radius of 1 m or less, has a length of at least 2 meters, and is pliable such that it can retain a rolled or bent radius.

BRIEF DESCRIPTION OF THE FIGURES

The invention will now be described by way of example only with reference to the accompanying figures in which.

DETAILED DESCRIPTION

According to an exemplary embodiment there is provided a photoluminescent aircraft floor path marking system comprising at least a flexible, pliable track incorporating a flexible photoluminescent portion wherein the track is bendable to a radius of 1 m or less and wherein the track is pliable such that it can retain a rolled or bent radius.

According to an exemplary embodiment, there is provided a photoluminescent aircraft floor path marking system comprising at least a flexible track having a housing incorporating a flexible, pliable, photoluminescent portion wherein the track is bendable to a radius of 1 m or less and wherein the track has a length of at least 2 m and wherein the track is pliable such that it can retain a rolled or bent radius.

Desirably the track is bendable to a radius of from 0.01 m to 1.0 m. More preferably the track is bendable to a radius of from 0.01 m to 0.5 m or from 0.01 m to 0.1 m or from 0.01 to 0.05 m. In some embodiments that track is bendable to a radius of from 0.05 to 0.5 m. It will be appreciated that the track can be rolled up along the longitudinal length of the track. The axis around which the track is rolled is perpendicular to a longitudinal length of the track. The axis may be parallel to a transverse direction across the track. It will be understood that pliable means that the material of the track of housing is supple enough to bend freely or repeatedly without breaking. Further it is desirable that the material is able to roll and to be able to retain a rolled or bent radius, particularly in storage. It is also desirable that the material is able to bend, preferably repeatedly, without exhibiting cracking or wear as a result of the bending.

In on exemplary embodiment, the flexible track may be provided in lengths greater than 2 m or from 2 m to 4 m or from 3 m to 4 m. In other embodiments, the track may be provided in lengths of from 4 m to 5 m or greater than 5 m, preferably greater than 10 m, more preferably greater than 50 m.

A particular advantage of the track in accordance with the invention is that the system can be installed as a single continuous section of track in an aircraft such as along an aisle. The track may be provided in lengths greater than 2 m or 3 m or 4 m or greater than 5 m. In some embodiments, the track is provided in lengths of 10 m or 25 m or 50 m or more such that a single length of track can be applied along the length of an aisle.

In some applications, a length of from 2 m or 3 m to 10 m may be preferred. A desired length may vary depending on an aircraft into which the track is to be installed. In some aircraft, a distance between one emergency exit and an adjacent emergency exit may be around 10 m. For such an aircraft, it may be desirable to have a length of about 10 m.

It will be appreciated that the material utilised for the track may be such that the track is flexible and pliable, i.e., that it can for example be rolled and stored in a rolled condition without springing back to a flat condition. Existing tracks are semi-rigid and although they can be bent to a certain degree without cracking they will spring back to a flat condition and cannot be stored in a rolled condition. Such tracks are not considered to be flexible and pliable. It is a particular advantage of the present concepts that the material selected has physical characteristics of flexibility and pliability that enable it to be bent or rolled and to be stored in the bent or rolled condition without springback forces in the material forcing the track to revert to a flat condition. It is desirable that the pliable track can retain the rolled or bent radius without any force being applied to overcome springback forces. It will be appreciated that a track that can be stored in a roll but that is able to unroll itself can still be regarded as falling within the scope of the present disclosure.

In some embodiments, the housing or track material may be pliable and may also comprise a polymeric smart material. A polymeric smart material is a material that has an ability to return from a temporary shape to an original shape under an external stimulus, such as a temperature change. Such materials may also be known as "shape-memory polymers" or SMPs. SMPs may be able to retain 2 or 3 shapes and may be arranged to transition between the shapes under the effect of a temperature change. An SMP may be arranged to have a different length under a first and a second temperature and to be able to move repeatedly between the first and the second length.

The flexible track comprises at least a housing. According to one embodiment, the flexible track is adapted to be secured to a floor surface of an aircraft. The housing may comprise a flexible and pliable holder that may be U shaped or may be provided with "wings" arranged to overlay a floor covering in an aircraft cabin. The "wings" may be flexible. The wings may also be pliable. It may be desirable to utilise an arrangement with "wings" in order to avoid a step in level that may be an obstruction to a trolley or other wheeled device moving in the aisle.

The skilled person will appreciate that the track is flexible in accordance with the present disclosure. In known systems, a flexible insert has been provided for insertion into a rigid or semi-rigid track. In such systems, it is necessary to store lengths of track ready for installation and such lengths have to be handled and transported to an aircraft prior to installation. The skilled person will appreciate that with a rigid or semi-rigid track a length of the track is limited by the need to enter the aircraft with the track. Entering through an aircraft door and negotiating installed galleys and seats limits a possible practical length of the rigid or semi-rigid track to around 2 m.

Desirably, the flexible floor path marking system can be provided in a roll. The flexible track is preferably arranged to be able to be provided in a roll that can be used to lay a continuous strip of the marking system. It will be appreciated that having a continuous strip reduces time taken to lay the track as it is no longer necessary to joint multiple sections. In addition, the number of joints is significantly reduced so reducing problems with ingress of moisture and contaminants. It will be appreciated that the roll may comprise a 3 m length or a 4 m length or a 5 m length or 5-10 m length or longer. In some embodiments, a roll may comprise a series of lengths.

The or each roll can be unrolled in place and the marker fitted to the floor of the aircraft. The track may be unrolled along an aisle of an aircraft and cut to an exact size with no or few joints. Advantageously, the pliable material may be cut to length. Desirably the pliable material of the track is easy to cut. It is envisaged that rolls may be up to 200 m long. In some embodiments, the rolls may contain longer lengths of photoluminescent markers and in yet other embodiments the rolls may contain less than 200 m of photoluminescent marker system. Preferably, the roll is at least 5.0 m long or more preferably at least 10 m long or more preferably at least 50 m long. In a most preferred embodiment, the roll of track for the photoluminescent system is at least as long as an aisle of an aircraft.

In an exemplary embodiment, the flexible floor path marking system comprises flexible photoluminescent material, a housing comprising a flexible holder, and optionally a flexible protective layer. In one embodiment, the flexible photoluminescent material may comprise a flexible substrate such as a vinyl or other flexible substrate. In some embodiments, the housing may be a flexible holder. The housing is arranged to be flexible. In some embodiments, the housing may be made of rubber or polyurethane, thermoplastic polyurethane, silicone or a flexible epoxy resin. It is desirable that each of the housing, photoluminescent material, substrate, and protective layer are pliable as well as flexible and able to be stored in a rolled or bent condition.

In some embodiments, a flexible spacer may be provided to space the flexible floor path marking system from a floor of an aircraft such that the marking system is substantially at a height of a carpet in the aircraft. The spacer may be provided with the flexible floor path marking system or may be provided in a separate roll and applied to the floor before the flexible floor path marking system is laid.

In some embodiments, the photoluminescent material may be provided in the form of an insert. In some embodiments, cut strips of the photoluminescent material may be fed into the flexible and pliable housing of the track, such as a polyurethane housing. In other embodiments, the photoluminescent material may be co-extruded with the pliable housing. In other embodiments, the photoluminescent material can be located in or secured to the housing.

In some embodiments, the photoluminescent material may be provided in suspension in a plastics material. In some embodiments, the photoluminescent material may be provided in a suspension of thermoplastic polyurethane. The housing and the photoluminescent material may be provided as a unitary extrusion. The photoluminescent material may be provided in a suspension in a unitary extrusion. Suitable plastics materials for such an extrusion may be selected from plastics such as of thermoplastic polyurethane. Other suitable materials may be selected from at least rubber, silicone polyurethane, thermoplastic elastomers (TPEs), thermoplastic elastomer polyurethane (TPE-U), Thermoplastic polyurethane (TPU), TPE-O-Thermoplastic Olefins (co-continues hard/soft blend), TPE alloys, styrenic block coplymers (TPE-S), Styrenic Block Copolymers Compounds (SEBS, SEPS, SBS, SIS), Thermoplastic Copolyester (TPE-E), Copolyester compound, Thermoplastic Polyamides (TPE-A), hydrogenated styrene block copolymers (TPE HSBC compounds). It will be appreciated that often the "E" is left out so these compounds may also be referred to as TPO, TPS, TPV, TPE, TPU and TPA.

Other material may be used provided that the material is transparent (or semi-transparent). Additionally, the material has to be a flexible polymeric material that can meet the requirements with regard to flammability, smoke release, toxic gas release which are required for aircraft applications.

The photoluminescent material may be provided in the form of coated particles in order to reduce abrasive properties of the photoluminescent material. A flexible protective coating may be applied over the photoluminescent material. In other embodiments a flexible cover may be provided over the photoluminescent material. In some embodiments, the photoluminescent material may be provided as an insert arranged to be inserted into the housing or track. In other embodiments, that photoluminescent material may be provided in the plastics material of the housing.

It may be desirable to provide a marker system that has a pattern or a perceived coloured in daylight or ambient light. The marker system may comprise a film that is coloured or has a pattern in or on the film. Alternatively, the colour may be integrated into the protective layer. The film or protective layer may comprise a pattern. In some embodiments, the film may be co-extruded with the photoluminescent material.

In other embodiments, a pattern or colour may be printed onto the photoluminescent material or included in the protective layer.

It is desirable that the photoluminescent material is provided in a flexible substrate such as a vinyl. Other flexible substrates may be used. The photoluminescent material may comprise photoluminescent phosphors or pigments. In preferred embodiments the photoluminescent pigments comprise strontium aluminate doped with europium and/or dysprosium. A preferred embodiment is $SrAl_2O_4:Eu^{2+},Dy^{3+}$ which produces a green emission with a maximum output at a wavelength of 520 nm. Another embodiment utilizes $Sr_4Al_{14}O_{25}:Eu^{2+},Dy^{3+}$ which produces an emission having a maximum output at around 490 nm.

The housing is flexible and may be formed of for example rubber, TPU [thermoplastic polyurethane] or other TPE [thermoplastic elastomer]. Other suitable materials have been described earlier. Desirably the photoluminescent material is retained within the housing. In a preferred embodiment the housing holds the photoluminescent material in position and is arranged to connect to the protective layer. In some embodiments the protective layer extends over the photoluminescent material but the housing does not extend over the photoluminescent material. In a further alternative arrangement the photoluminescent material may be provided within the housing such that the housing material extends over the photoluminescent material. It will be appreciated that when the track comprises a housing and a protective layer that the protective layer is also arranged to be flexible and pliable such that the track as a whole is bendable to a radius of 1 m or less and the track is pliable such that it can retain a rolled or bent radius without any force being applied.

In an exemplary embodiment, the protective layer is connected or secured to the housing. It is desirable that the protective layer extends over the photoluminescent material. The protective layer is designed to be flexible and robust. It is also preferred that the protective layer is arranged to be scratch resistant. It is preferred that the protective layer is selected to be of a material that is transparent or at least partially transparent to electromagnetic radiation of from 300 nm to 750 nm or more preferably in the range of from 400 nm to 600 nm.

In an exemplary embodiment, the protective layer is transparent or partially transparent to light transmission in the range of from 400 nm to 500 nm to allow charging of the photoluminescent material. In a preferred embodiment the protective layer is transparent or partially transparent to light in the range of from 300 nm to 750 nm.

It is preferred that the protective layer is transparent or partially transparent to electromagnetic radiation in the range of from 450 nm to 600 nm and more preferably from 400 nm to 600 nm to allow transmission of the emitted luminescent light from the photoluminescent material.

In an exemplary embodiment, the protective layer is self-healing. The protective layer may comprise polyurethane. Desirably the polyurethane is self-healing in the event of any physical damage. It is also desirably that the protective layer is chemically resistant. In some embodiments the housing or track may be self-healing. It will be understood that a self-healing material is able to correct and/or repair damage to the material without any external diagnosis of the damage of human intervention. It will be appreciated that self-healing materials are able to counter the cracks and damage that occurs due to natural degradation through the initiation of a repair mechanism that responds to the micro damage and repairs the cracks etc. It will be appreciated that a material that is able to self-heal will have a longer useful lifetime and will be able to reduce the impact of costly and time consuming removal and replacement of the track or section of the track.

In some embodiments, the marker system comprises a coloured layer. The coloured layer may be arranged to colour match the marker system to airline carpets and/or to airline livery. The coloured layer may comprise a film or may comprise printing on the photoluminescent material or within or on the protective layer.

It is desirable that in the event of damage to the protective layer and/or the housing or photoluminescent material that a damaged portion of the marker system can be removed and replaced.

It is envisaged that the flexible track can be readily laid in place along the aisles and along spurs such as to the emergency exit doors or through the galley sections. The flexible and pliable nature of the marker system is such that the marker system can be stored on a roll and readily laid on an aircraft floor. Other means of storing and/or laying the marker system on the aircraft floor may be utilised by the skilled person. It will be appreciated that this will facilitate installation and maintenance of the system to the advantage of the airlines using the marker system. It is anticipated that a roll of the marker system may be readily stored by an airline to be ready in case of damage to installed system.

It is preferred that all of the materials of the marker system comply with the requirements of safety standard CS25. It is preferred that the system is made of a non-flammable material.

In some embodiments, the marker system is secured to the floor or to the carpet by means of adhesive. In other embodiments the marker system is secured to the spacer material, optionally by means of adhesive.

According to a second aspect, there is provided a method of fitting a flexible photoluminescent floor path marking system in accordance with the first aspect of the invention comprising providing a roll of the flexible photoluminescent floor path marker system; unrolling the marker system onto a floor of an aircraft and securing the marker system to the floor.

In some embodiments, the marker system is secured to the floor by means of an adhesive. In other embodiments a spacer is provided and secured to the floor and the marker system is fixed to the spacer.

Desirably a thickness of the spacer is selected such that the flexible photoluminescent floor path marking system is at a similar height to a carpet laid on the floor.

In some methods, the marker system comprises a flexible track having a flexible photoluminescent insert. The track may further comprise a protective cover. In other embodiments the insert may be received in a longitudinally extending slot within the housing. In some methods the track may be installed on the floor of an aircraft in a first step. The photoluminescent material may be installed in the track in a second step. In other methods the track may be provided with the photoluminescent material pre-installed. In some methods the track may be provided with the photoluminescent material integral with the housing of the track.

According to a third aspect, there is provided an aircraft having a cabin having a flexible photoluminescent floor path marking system installed in the aircraft cabin wherein the system comprises at least a flexible pliable track and photoluminescent material housed in the track.

Figure 1:
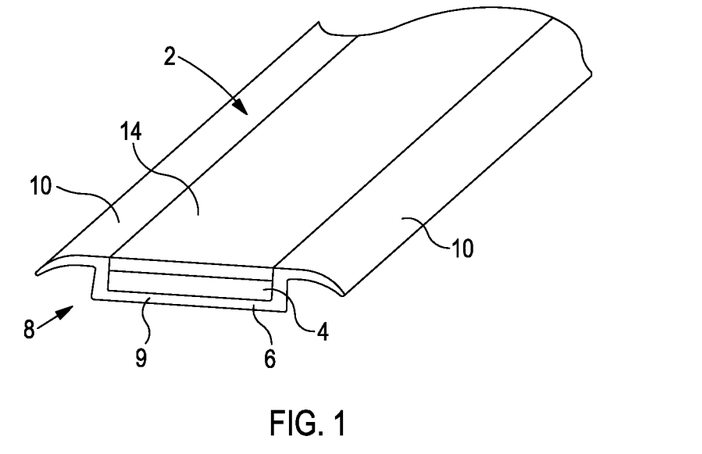
FIG. 1 is a perspective view of a marker system in accordance with the invention.

Turning now to the accompanying drawings, FIG. 1 illustrates a flexible photoluminescent floor path marking system in accordance with an exemplary embodiment and comprising a flexible track 2 and photoluminescent material 4 located in the track 2.

In this embodiment, the flexible track comprises a housing 6 adapted to be secured to a floor surface of an aircraft. The flexible track 2 comprises a central section 8 comprising a generally U shaped section 9. The flexible track 2 further comprises laterally extending "wings" 10 arranged to overlay a floor covering in an aircraft cabin. The "wings" 10 are made of a flexible and pliable material. In this embodiment the "wings" are arranged to be unitary with the central section 8. The flexible track may be formed by extrusion. An arrangement with "wings" is advantageous in avoiding a step in level that may be an obstruction to a trolley or other wheeled device moving in the aisle of an aircraft cabin.

The housing 6 is arranged to be flexible. In some embodiments, the housing may be made of rubber or polyurethane, thermoplastic polyurethane, silicone, a thermoplastic elastomer or a flexible epoxy resin. It will be appreciated that the housing is flexible and pliable and able to be stored in a rolled or bent without springback forces reverting the track to a flat condition. It will be understood that the track is pliable such that it can retain a rolled or bent radius.

The flexible floor path marking system further comprises flexible photoluminescent material 4. In this embodiment the marker system further comprises a flexible protective cover 14. It will be appreciated that the cover is optional but it is desirable that a protective covering is provided. The flexible photoluminescent material comprises a flexible substrate such as a vinyl. In some embodiments the photoluminescent material may be provided in the housing. The photoluminescent phosphor or pigment may be provided in the plastics material of the housing.

Although not illustrated, the skilled person will appreciated that a flexible spacer may be provided to space the flexible floor path marking system from a floor of an aircraft such that the marking system is substantially at a height of a carpet in the aircraft. The spacer may be provided with the flexible floor path marker system or may be provided in a separate roll and applied to the floor before the flexible floor path marker system is laid.

Figure 2:
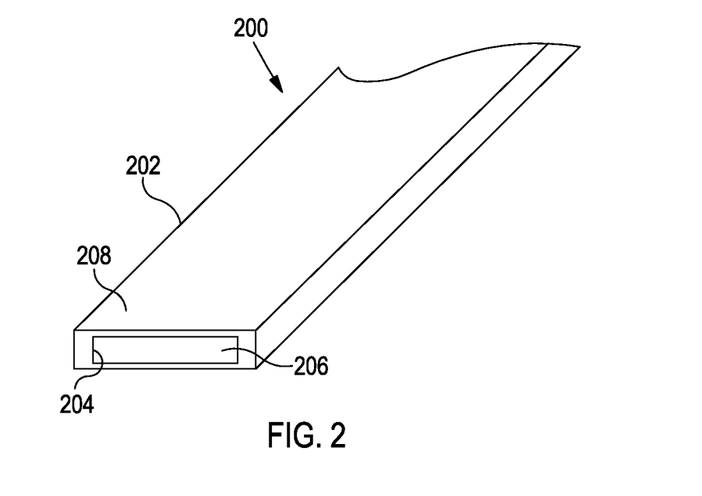
FIG. 2 is a perspective view of an alternative marker system.
Figure 3:
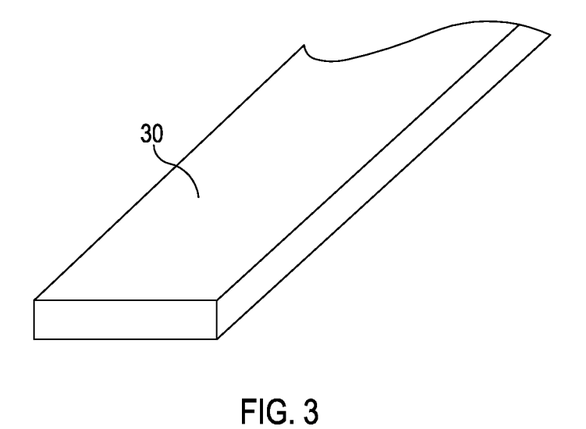
FIG. 3 is a perspective view of an insert or track.

In some embodiments, the photoluminescent material is provided in the form of a separate insert 208 illustrated in FIG. 2 and as insert 30, illustrated in FIG. 3, and may be provided in a separate continuous reel. Strips of the photoluminescent material can be inserted into the track. The insert 208 or 30 can be located in or secured to the housing 6 of the flexible track of FIG. 1. In other embodiments, the photoluminescent material may be co-extruded with the housing. In other embodiments, the insert 208 or 30 may be used as the track and applied directly to the floor of the aircraft. In such embodiments, the track may be secured to the floor of the aircraft by means of an adhesive or by a filler material and an adhesive. Both the housing and the insert are arranged to be flexible and pliable such that the track and the insert are each bendable to a radius of 1 m or less wherein the track and the insert are pliable such that each can retain a rolled or bent radius.

The photoluminescent material may be provided in the form of coated particles in order to reduce abrasive properties of the photoluminescent material. A flexible protective coating 14 can be applied over the photoluminescent material 4 and secured in central section 8 of the flexible track.

The photoluminescent material can be provided as a layer of photoluminescent material. In some embodiments, a reflective layer may also be provided as a base or sub layer. A coating or cover may be applied and can be arranged to be transparent to light that is emitted from the photoluminescent material and is further selected to be transparent or semi-transparent to wavelengths of electromagnetic radiation that charges the photoluminescent material 4.

The photoluminescent material 4 is provided in a flexible substrate such as a vinyl. It will be appreciated that alternative flexible and pliable substrates may be used. The photoluminescent material may comprise photoluminescent phosphors or pigments. In preferred embodiments the photoluminescent pigments comprise strontium aluminate doped with europium and/or dysprosium. A preferred embodiment is $SrAl_2O_4:Eu^{2+},Dy^{3+}$ which produces a green emission with a maximum output at a wavelength of 520 nm. An alternative embodiment utilises $Sr_4Al_{14}O_{25}:Eu^{2+},Dy^{3+}$ which produces an emission having a maximum output at around 490 nm.

In some embodiments, the marker system further comprises a film (not illustrated) that is coloured and arranged to change the perceived colour of a the photoluminescent material. The film may operate by only allowing light of a certain wavelength to pass through the film. In other embodiments, the film can comprise a pattern. The film can be overlaid on the photoluminescent material 4 in the track or housing or may be co-extruded with the photoluminescent material 4 or the track or housing or with both. The film can be colour matched to an adjacent carpet or arranged to provide a desirable contrast. It is considered to be desirable to match the colour and pattern on the film to that of the carpet in the aisle to avoid drawing notice to the emergency lighting system.

In other embodiments, a pattern or colour can be printed onto the photoluminescent material. Alternatively, a pattern or colour can be embedded in the photoluminescent material. In other embodiments, the pattern may be provided in or on the protective layer. The pattern may be provided in a film that is secured to the protective layer or co-extruded with the protective layer. The skilled person will be familiar with alternative arrangements such that a pattern or colour is incorporated into a covering for the photoluminescent material FIG. 2 illustrates another exemplary embodiment in which the track 200 comprises a housing 202 having a longitudinally extending slot 204 within the housing forming the track. The track 200 is formed of a flexible material such as a thermoplastic poly urethane or a silicone or thermoplastic elastomer and is able to be rolled. The photoluminescent material 206 is provided in the form of an insert that is arranged to be a push fit within the housing 202 which may then be fixed in the central section 8 of the track 2 as discussed in relation to FIG. 1 or in an alternative embodiment the housing 202 may be fixed directly to the floor surface of an aircraft cabin. The photoluminescent material 206 is in some embodiments provided in a vinyl layer and is flexible enough to roll but has sufficient rigidity to be able to be inserted within the housing. At least the upper part 208 of the housing 202 is transparent or at least partially transparent to wavelengths emitted by the photoluminescent material and to wavelengths utilised for charging the photoluminescent material.

The marker system can be arranged to be secured to the floor or to the carpet by means of adhesive. In other embodiments, the marker system is secured to the spacer material, optionally by means of adhesive. A thickness of the spacer is selected such that the flexible photoluminescent floor path marking system is at a similar height to a carpet laid on the floor.

Figure 4:
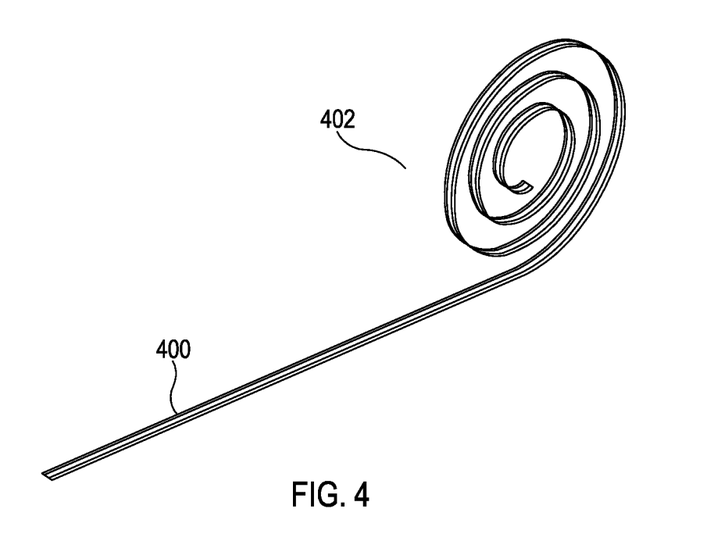
FIG. 4 is a perspective view of a roll of the marker system in accordance with the invention.

The flexible floor path marker system 400 can be provided in a roll 402, as is illustrated in FIG. 4. The roll 402 may be used to lay a continuous strip of the marker system 400 along the aisle of the aircraft. In use, the or each roll 402 can be unrolled in place in the aircraft and the marker system fitted to the floor of the aircraft. The track may be unrolled along an aisle of an aircraft and cut to an exact size with no joints or few joints. It is envisaged that the roll 402 of track for the photoluminescent system is at least as long as a section of an aisle of an aircraft. In some aircraft each section may extend from a first emergency exit to an adjacent emergency exit. In some aircraft such a section may for example be 10 m. In other aircraft a section may be longer or shorter. It will be appreciated that some expansion joints may have to be provided. In use an aircraft cabin may experience significant expansion and contraction in response to air pressure. It will be appreciated that an aircraft cabin may expand in overall length during flight due to low external pressures. An advantage of the concepts disclosed herein is that the track may be arranged to stretch in the course of the flight and is able to stretch with the expansion of the aircraft. Pliable materials are softer than the previously used rigid or semi-rigid materials. Pliable materials are able to stretch with the aircraft and are able to return to original dimensions when the aircraft is at lower altitudes. The track may comprise a polymeric smart material (PSM). The track may be arranged to comprise a self-healing polymer.

Figure 5:
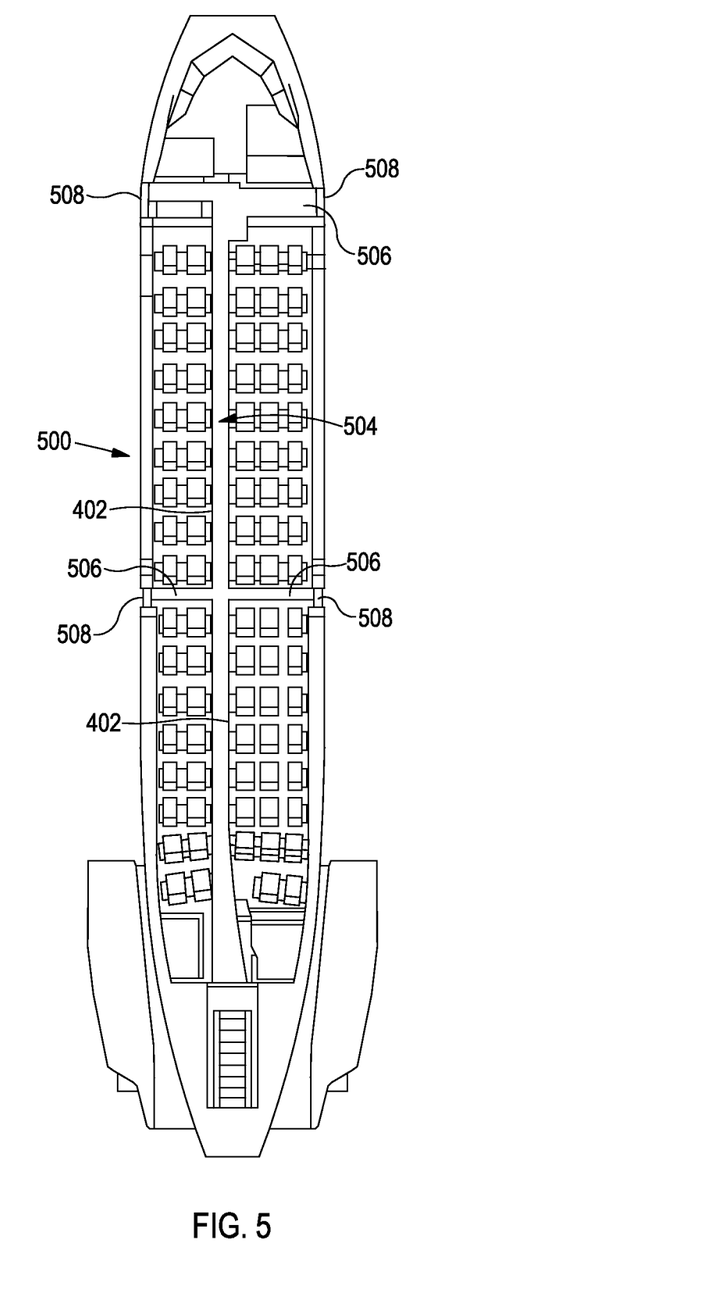
FIG. 5 is a schematic indication of an aircraft with the marker system installed.

It is envisaged that in accordance with the second aspect of the concepts disclosed herein that a roll 402 of the flexible track can be used in an aircraft cabin 500 as illustrated in FIG. 5, to unroll the flexible track 400 and lay it in place along the aisles 504 of the aircraft. The track 400 can also be laid along spurs 506 such as to the emergency exit doors 508 or through the galley sections and the sections of track 402 can be jointed to one another. The flexible nature of the marker system is such that the marker system can be stored on a roll and can be unrolled onto an aircraft floor. It will be appreciated that this will facilitate installation and maintenance of the system to the advantage of the airlines using the marker system.

What is claimed is:

1. A photoluminescent aircraft floor path marking system comprising a flexible track having a housing incorporating a flexible, pliable, photoluminescent portion, wherein the track is bendable to a radius of 1 meter or less, wherein the track has a length of at least 2 meters, and wherein the track is able to retain a rolled or bent radius without any force being applied to overcome springback forces.

2. The photoluminescent aircraft floor path marking system of claim 1, wherein the flexible track is bendable to a radius in the range of from 0.01 to 1.0 meters.

3. The photoluminescent aircraft floor path marking system of claim 1, wherein the flexible track is provided in lengths of greater than 3 meters.

4. The photoluminescent aircraft floor path marking system of claim 1, wherein:
the flexible floor path marking system further comprises a flexible protective layer; and/or
the flexible photoluminescent portion comprises a flexible substrate; and/or
the flexible housing comprises a holder for the photoluminescent portion.

5. The photoluminescent aircraft floor path marking system of claim 4, wherein the flexible floor path marking system comprises a flexible protective layer and the protective layer extends over the photoluminescent portion.

6. The photoluminescent aircraft floor path marking system of claim 5, wherein the protective layer is transparent or at least partially transparent to light transmission in the range of from 300 nanometers to 750 nanometers.

7. The photoluminescent aircraft floor path marking system of claim 5, wherein the protective layer is self-healing.

8. The photoluminescent aircraft floor path marking system of claim 7, wherein the protective layer comprises polyurethane.

9. The photoluminescent aircraft floor path marking system of claim 1, wherein the flexible track comprises a material selected from the group consisting of a rubber, a silicone, a thermoplastic polyurethane, a thermoplastic polyurethane, and a thermoplastic elastomer (TPE).

10. The photoluminescent aircraft floor path marking system of claim 1, wherein the photoluminescent portion is provided in the form of a strip and one or more strips of the photoluminescent portion are inserted into the housing.

11. The photoluminescent aircraft floor path marking system of claim 1, wherein the photoluminescent portion is co-extruded or embedded within the flexible track.

12. The photoluminescent aircraft floor path marking system of claim 1, wherein the marking system further comprises a film arranged to shift the perceived colour of a colour output from a photoluminescent material in the photoluminescent portion.

13. The photoluminescent aircraft floor path marking system of claim 12, wherein the film is co-extruded with the photoluminescent material.

14. The photoluminescent aircraft floor path marking system of claim 1, wherein a pattern or colour is:
   printed onto the photoluminescent portion; or
   embedded in the photoluminescent portion; or
   incorporated into a covering for the photoluminescent portion.

15. The photoluminescent aircraft floor path marking system of claim 1, wherein the photoluminescent portion comprises pigments, the pigments comprising strontium aluminate doped with at least one of europium or dysprosium.

16. The photoluminescent aircraft floor path marking system of claim 1, wherein the flexible track further comprises at least one over carpet wing.

17. An aircraft having a cabin with a photoluminescent floor path marking system installed in the aircraft cabin, wherein the photoluminescent aircraft floor path marking system comprises:
   a flexible track having a housing incorporating a flexible, pliable, photoluminescent portion, wherein:
   the track is bendable to a radius of 1 m or less;
   the track has a length of at least 2 meters; and
   the track is able to retain a rolled or bent radius without any force being applied to overcome springback forces.

18. A photoluminescent aircraft floor path marking system comprising at least a flexible track, the flexible track being adapted to be secured to a floor surface of an aircraft by at least an adhesive, the flexible track comprising a flexible housing incorporating a flexible, pliable, photoluminescent portion, wherein the flexible track is bendable to a radius of 1 meter or less, wherein the flexible track has a length of at least 2 meters, and wherein the flexible track is able to retain a rolled or bent radius without any force being applied to overcome springback forces.

19. A photoluminescent aircraft floor path marking system comprising at least a flexible track, the flexible track being adapted to be secured to a floor surface of an aircraft by at least an adhesive, the flexible track comprising a flexible housing incorporating a flexible, pliable, photoluminescent portion, wherein the flexible track is bendable to a radius of 1 meter or less, wherein the flexible track has a length of at least 2 meters, and wherein the flexible track can bend freely without breaking and can retain a rolled or bent radius without any force being applied to overcome springback forces.

\* \* \* \* \*